US008839607B2

(12) United States Patent
Pursifull et al.

(10) Patent No.: US 8,839,607 B2
(45) Date of Patent: Sep. 23, 2014

(54) EJECTOR IN CONJUNCTION WITH POST-CATALYST EXHAUST THROTTLE FOR VACUUM GENERATION

(71) Applicant: Ford Global Technologies, LLC, Dearborn, MI (US)

(72) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 13/713,982

(22) Filed: Dec. 13, 2012

(65) Prior Publication Data

US 2014/0165536 A1 Jun. 19, 2014

(51) Int. Cl.
*F01N 3/22* (2006.01)
*F01N 3/10* (2006.01)

(52) U.S. Cl.
CPC ....................................... *F01N 3/10* (2013.01)
USPC ................... 60/292; 60/274; 60/280; 60/281; 60/290; 60/293; 60/295; 60/300; 60/324

(58) Field of Classification Search
USPC ........... 60/274, 280, 281, 284, 285, 287, 289, 60/290, 291, 292, 293, 295, 300, 324
See application file for complete search history.

(56) References Cited

U.S. PATENT DOCUMENTS

| | | | |
|---|---|---|---|
| 5,410,875 A * | 5/1995 | Tanaka et al. | ................... 60/288 |
| 6,343,594 B1 | 2/2002 | Koeslin et al. | |
| 7,617,678 B2 | 11/2009 | Joergl et al. | |
| 7,833,301 B2 | 11/2010 | Schindler et al. | |
| 8,176,894 B2 | 5/2012 | Ulrey et al. | |
| 2003/0014966 A1 | 1/2003 | Hirota et al. | |
| 2006/0179824 A1 | 8/2006 | Roser | |
| 2009/0094978 A1 | 4/2009 | Yamagata et al. | |
| 2010/0005784 A1 | 1/2010 | Bird et al. | |
| 2010/0126142 A1 | 5/2010 | Murata et al. | |

(Continued)

FOREIGN PATENT DOCUMENTS

| | | |
|---|---|---|
| DE | 19959485 A1 | 6/2001 |
| EP | 1662123 A2 | 5/2006 |

(Continued)

OTHER PUBLICATIONS

Ulrey, Joseph Norman et al., "Method and System for Catalyst Temperature Control," U.S. Appl. No. 13/743,247, filed Jan. 16, 2013, 42 pages.

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT

Methods and systems are provided for expediting catalyst heating and generating vacuum by controlling an EBV to direct exhaust through an ejector arranged in parallel with the EBV. A position of the EBV may be controlled to achieve a desired exhaust backpressure for current engine operating conditions and stored vacuum level. Compensation for the effect of EBV position on engine airflow may be provided by adjustment of other parameters such as intake throttle position and spark timing.

20 Claims, 9 Drawing Sheets

(56) References Cited

U.S. PATENT DOCUMENTS

| | | | |
|---|---|---|---|
| 2010/0206265 A1* | 8/2010 | Yamagata et al. | ............ 123/337 |
| 2012/0031381 A1 | 2/2012 | Styles et al. | |
| 2012/0124980 A1 | 5/2012 | Prenger et al. | |

FOREIGN PATENT DOCUMENTS

| | | |
|---|---|---|
| EP | 1906000 A2 | 4/2008 |
| JP | 2768734 B2 | 6/1998 |
| JP | 2897426 B2 | 5/1999 |
| JP | 2002081311 A | 3/2002 |
| JP | 2003232213 A | 8/2003 |
| JP | 2004076683 A | 3/2004 |
| JP | 2004225539 A | 8/2004 |
| JP | 2009008022 A | 1/2009 |
| JP | 2009097404 A | 5/2009 |
| JP | 2009114991 A | 5/2009 |
| JP | 2012036829 A | 2/2012 |
| WO | 2008013585 A2 | 1/2008 |
| WO | 2009099399 A1 | 8/2009 |

OTHER PUBLICATIONS

Ulrey, Joseph Norman et al., "Method and System for Vacuum Control," U.S. Appl. No. 13/743,262, filed Jan. 16, 2013, 44 pages.

* cited by examiner

EJECTOR IN CONJUNCTION WITH POST-CATALYST EXHAUST THROTTLE FOR VACUUM GENERATION

FIELD

The present disclosure relates to an internal combustion engine including a post-catalyst exhaust backpressure valve.

BACKGROUND AND SUMMARY

Multiple vehicle subsystems, such as the vehicle brakes, may utilize vacuum as an actuation force. The vacuum is typically supplied by the engine through a connection to the intake manifold, which is at sub-barometric pressure when the throttle is partially closed and regulating the airflow into the engine. However, the engine intake manifold vacuum may not be sufficient for all of the subsystems at all operating conditions. For example, during a catalyst heating mode immediately after engine starting, a high level of spark retard may be used to generate exhaust heat directed to the catalyst, resulting in insufficient vacuum from the intake manifold. In some examples, engine-driven or electrically-driven vacuum pumps may be used to supplement intake manifold vacuum during such operating conditions. However, engine-driven vacuum pumps may disadvantageously reduce fuel economy, while electrically-driven vacuum pumps may lack durability while being expensive, heavy, and noisy.

The inventors have recognized the issues with these options for vacuum generation during operating conditions where engine intake manifold is insufficient, and offer systems and methods to at least partly address them which provide the further advantage of expediting catalyst warming. In one embodiment, a method for an engine includes adjusting a position of an exhaust backpressure valve (EBV) downstream of a catalyst in an exhaust passage based on engine operating conditions and stored vacuum, and flowing exhaust through an ejector arranged in parallel with the EBV in an amount depending on EBV position. The inventors have recognized that the arrangement of an ejector in parallel with a post-catalyst EBV, such as in the various examples described herein, enables both vacuum generation and catalyst heating via closure of the EBV. For example, the EBV may be fully closed to direct substantially all exhaust through the ejector to maximize vacuum generation while expediting catalyst heating via the increase in backpressure at the catalyst resulting from the EBV closure. Alternatively, the EBV may be partially closed to direct a lesser amount of exhaust through the ejector to generate vacuum and expedite catalyst heating during conditions where full closure of the EBV is unnecessary or impractical, such as unstable combustion conditions. Further, EBV control may be tailored for engine operation phases such as cold start, gasoline particulate filter regeneration, normal operation, and shutdown to maximize the benefits of the EBV while reducing negative effects on engine operation by strategically timing and adjusting EBV closure and/or controlling other parameters such as intake throttle position and spark timing to compensate for the effects of EBV adjustment.

The present disclosure may offer several advantages. For example, rapid catalyst heating may be attained. By rapidly heating the catalyst, exhaust emissions during engine cold starts may be reduced. Additionally, vacuum may be generated in copious amounts during the very condition (catalyst heating) when it is less available via the intake manifold. This is accomplished by directing exhaust through the ejector arranged in parallel with the EBV, thus reducing the need for engine-driven or electrically-driven vacuum pumps to supplement intake manifold vacuum.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
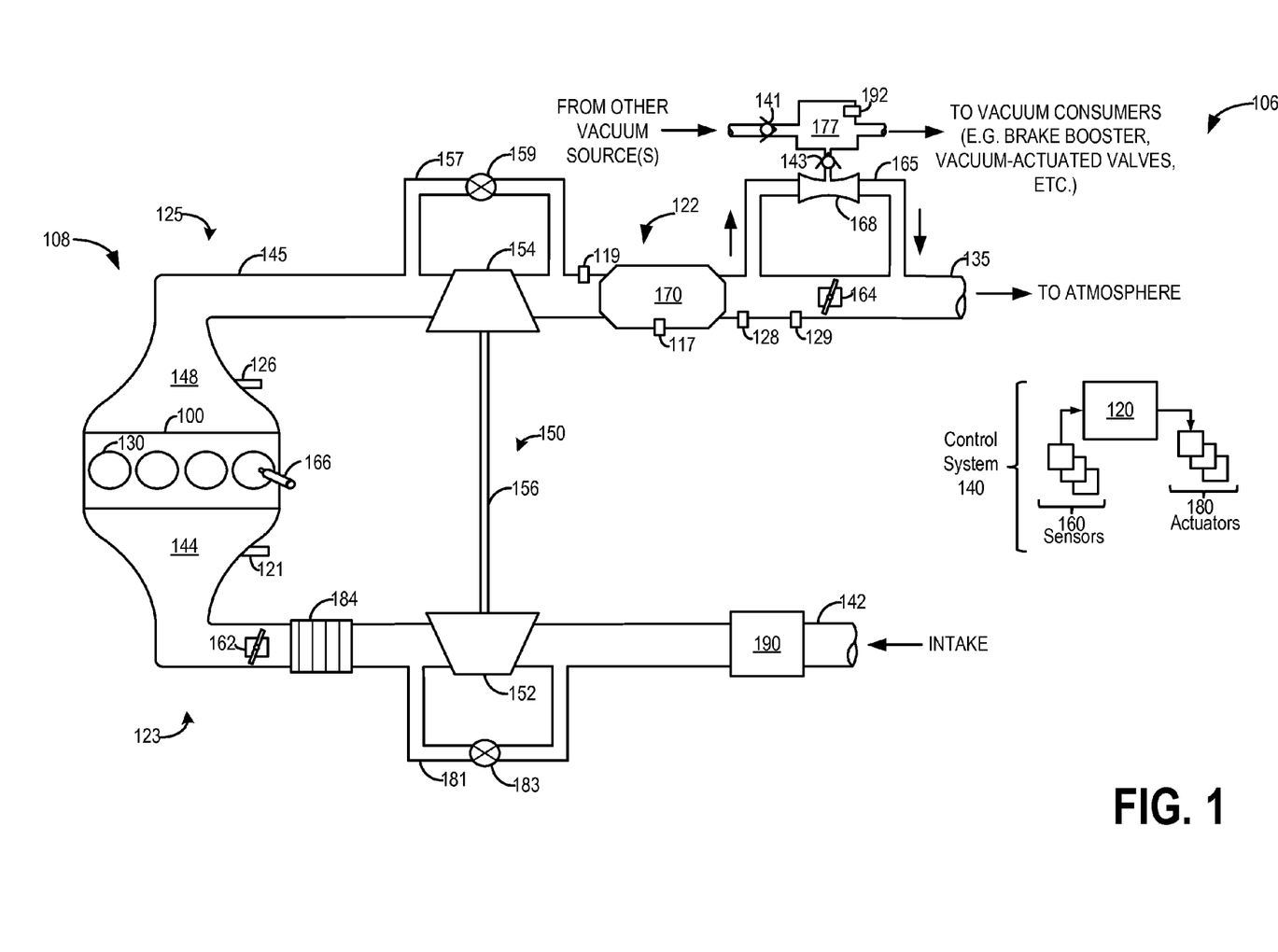
FIG. 1 shows a schematic depiction of a vehicle system including a post-catalyst exhaust backpressure valve.
Figure 2:
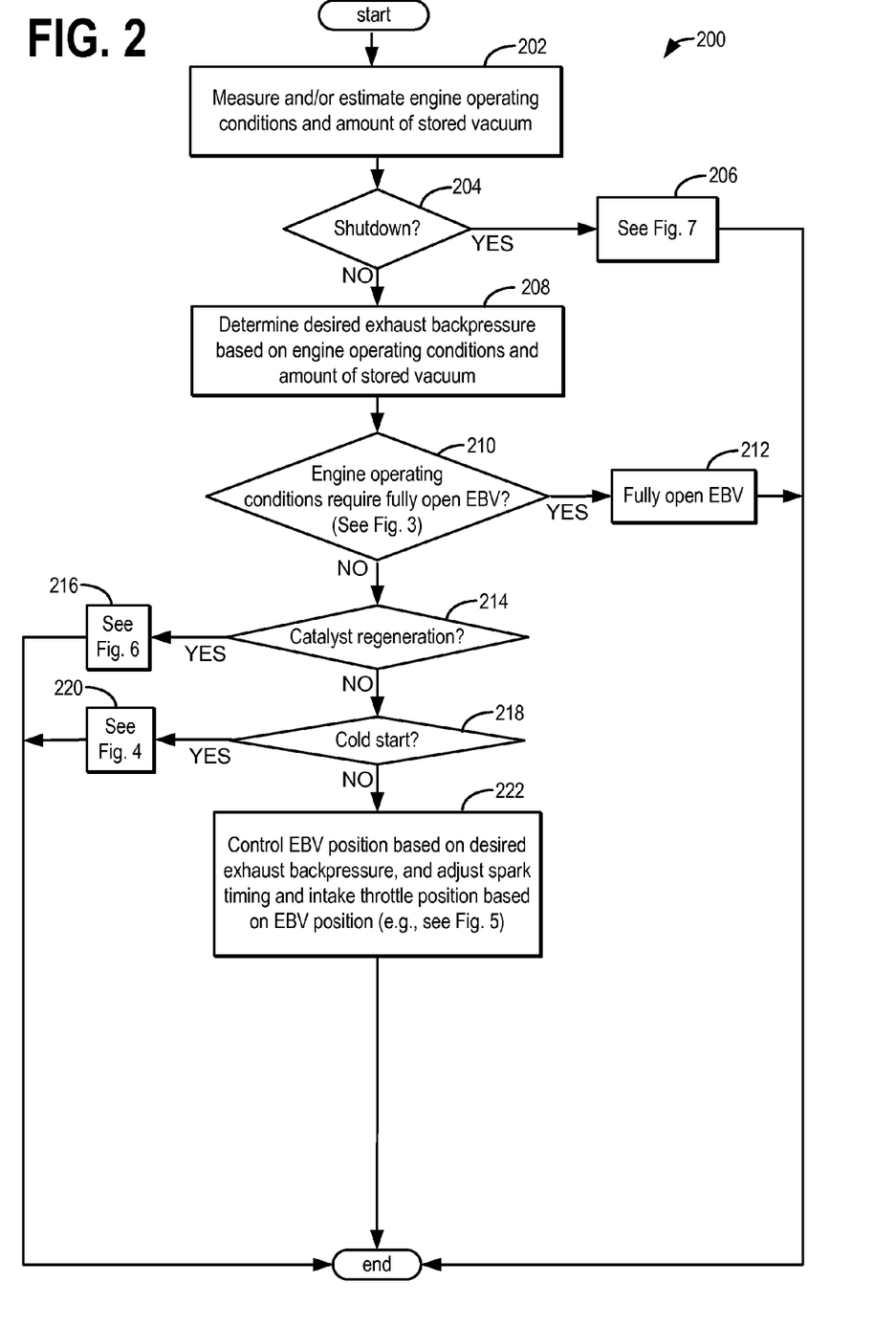
FIG. 2 shows a high level flow chart illustrating a method that may be implemented for controlling an exhaust backpressure valve according to the present disclosure.
Figure 4:
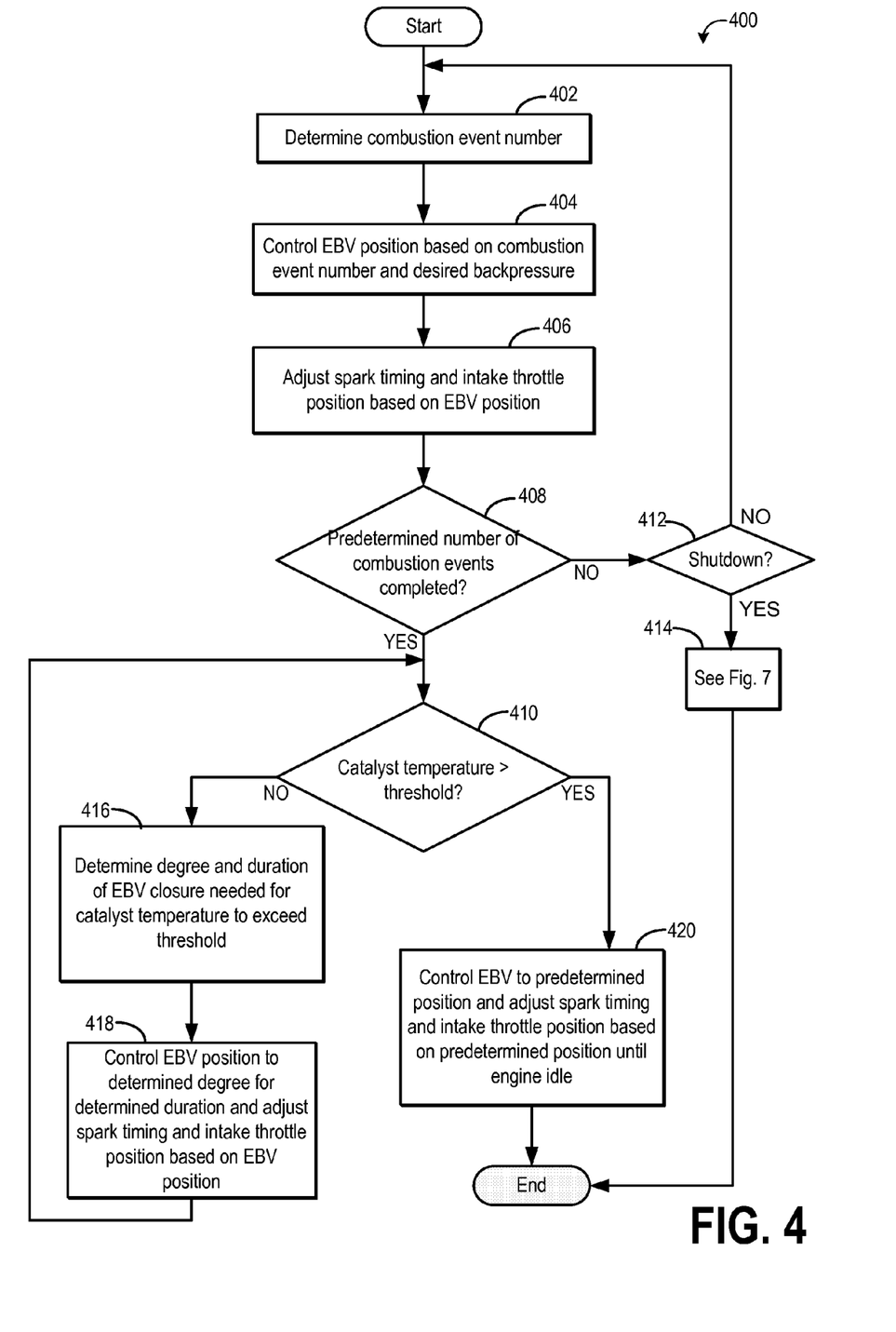
FIG. 4 shows a high level flow chart illustrating a method that may be implemented for controlling an exhaust backpressure valve during an engine cold start according to the present disclosure.
Figure 6:
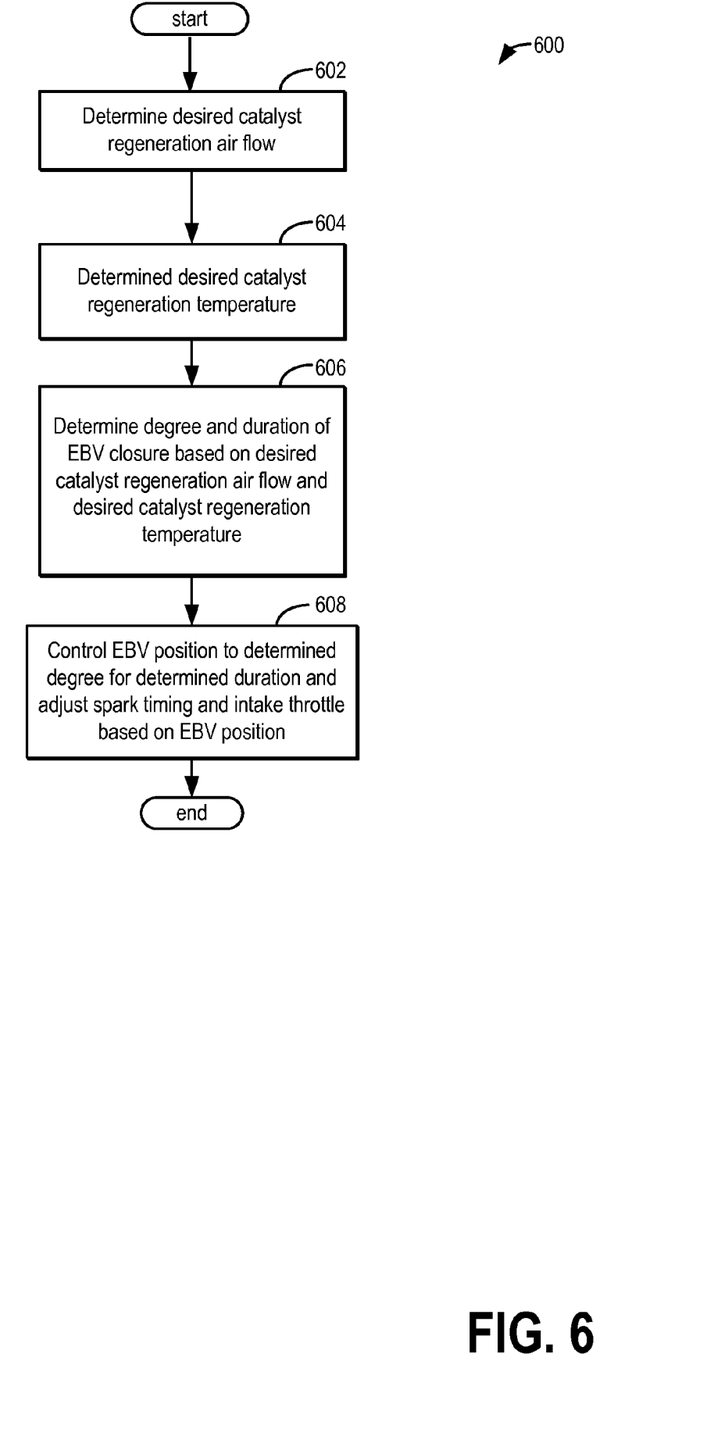
FIG. 6 shows a high level flow chart illustrating a method that may be implemented for controlling an exhaust backpressure valve during catalyst regeneration according to the present disclosure.
Figure 7:
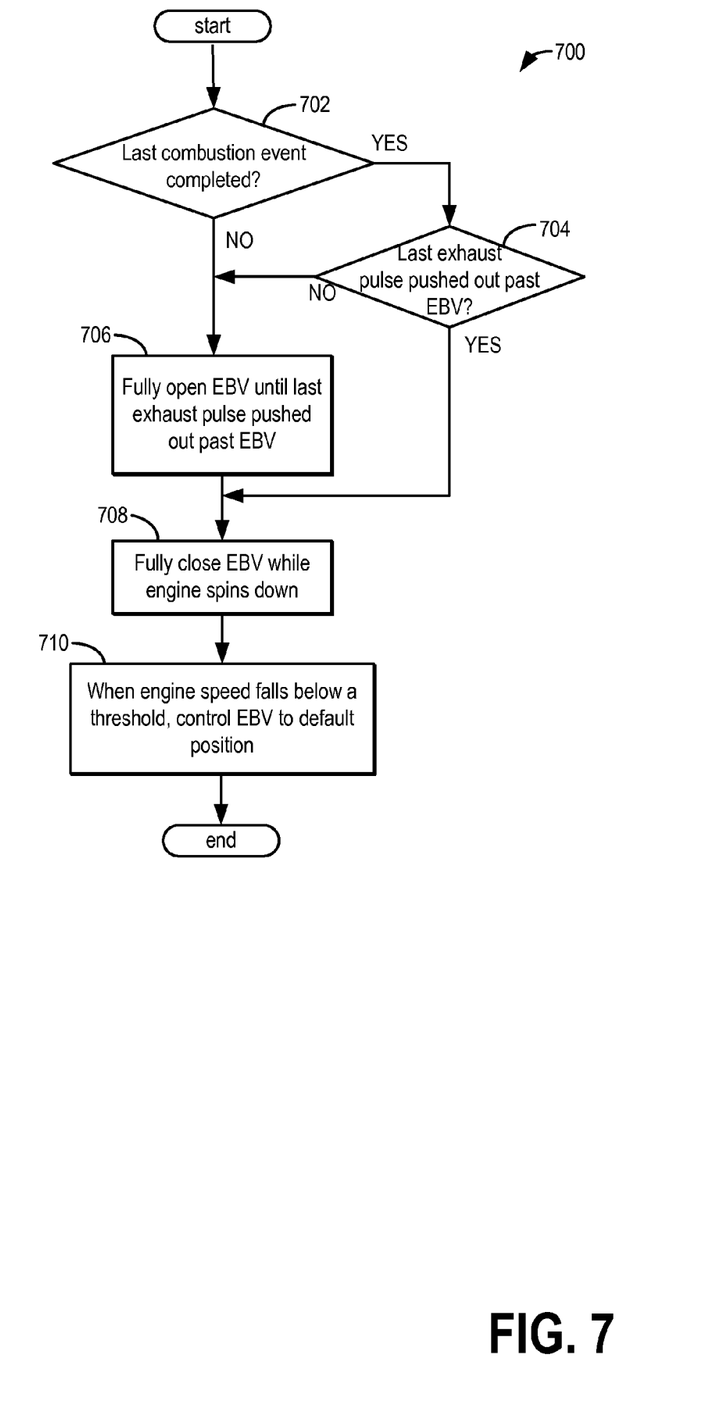
FIG. 7 shows a high level flow chart illustrating a method that may be implemented for controlling an exhaust backpressure valve during engine shutdown according to the present disclosure.
Figure 8:
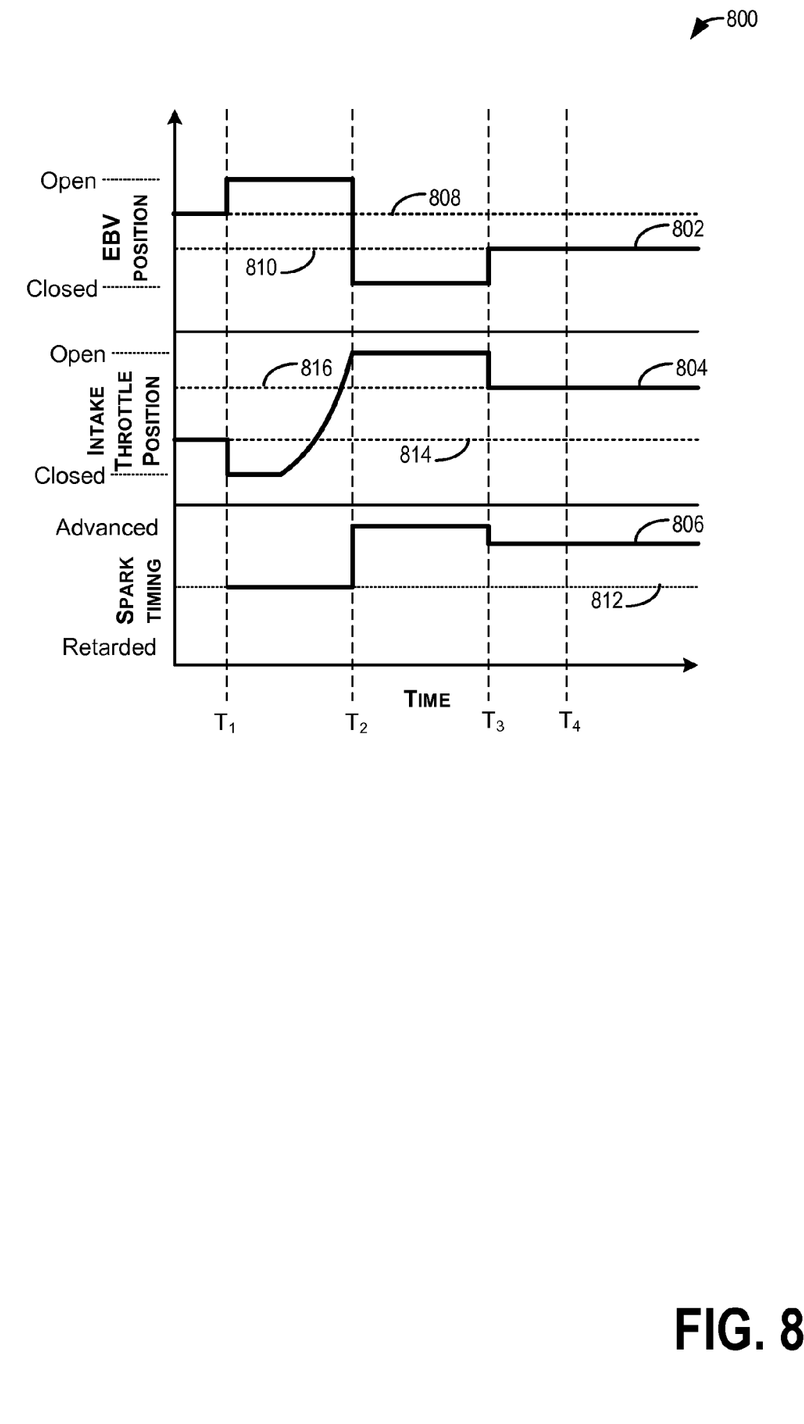
FIG. 8 shows a timing diagram 800 illustrating EBV position, intake throttle position, and spark timing during an engine cold start according to the present disclosure.
Figure 9:
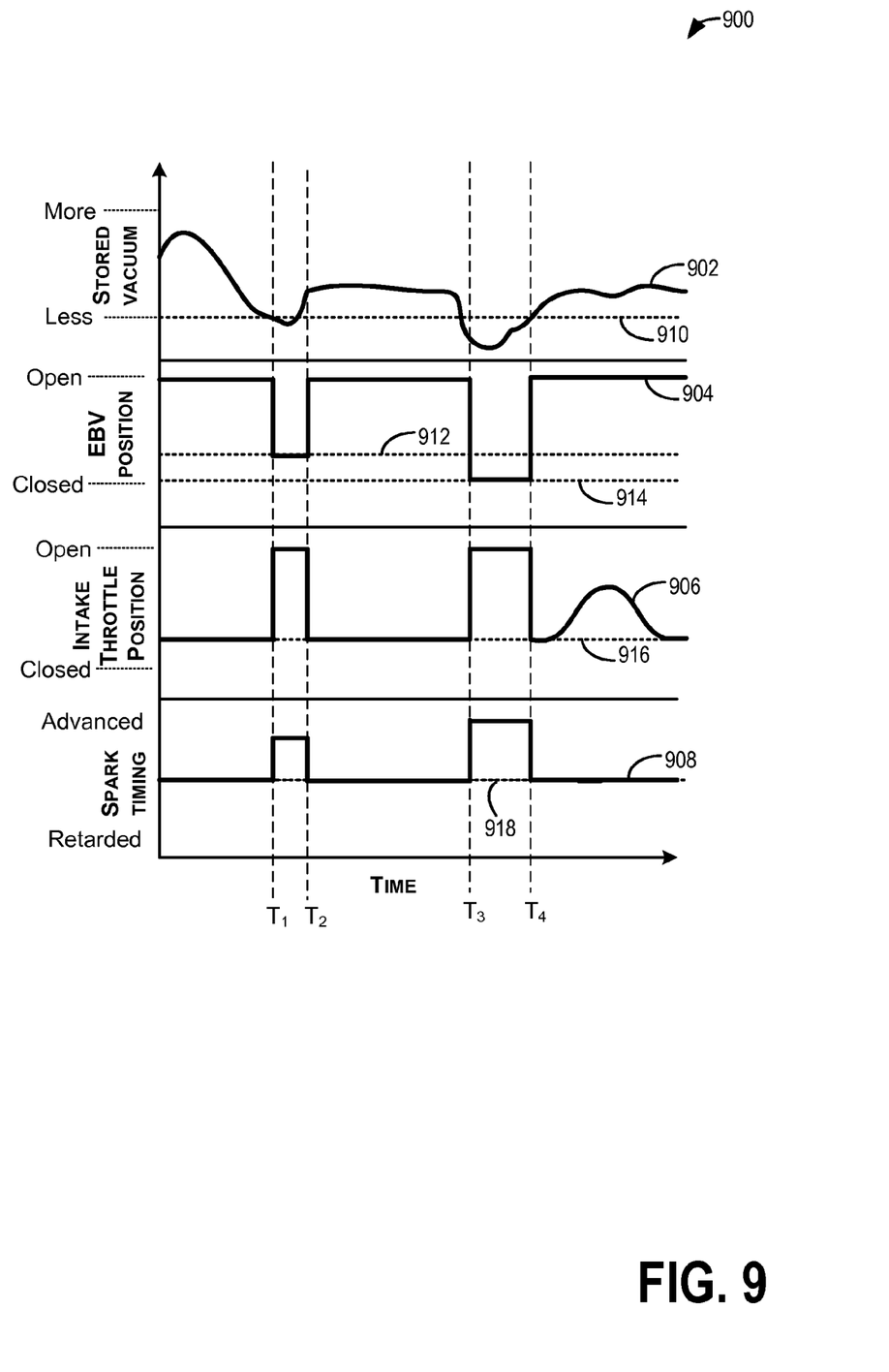
FIG. 9 shows a timing diagram 900 illustrating stored vacuum level, EBV position, intake throttle position, and spark timing during engine operation according to the present disclosure.

The following description relates to systems and methods for generating engine vacuum while expediting catalyst heating by controlling an EBV to direct exhaust through an ejector arranged in parallel with the EBV, the ejector coupled with a vacuum reservoir providing vacuum to one or more vacuum consumers. As shown in FIG. 1, a boosted engine may include an EBV arranged downstream of a catalyst. An ejector may be arranged in parallel with the EBV (e.g., in a passage coupled to the engine exhaust passage upstream and downstream of the EBV, and a vacuum reservoir may be coupled with the ejector to store vacuum generated by motive flow of engine exhaust through the ejector. As shown in FIG. 2, different control strategies for the EBV may be used depending on engine operating conditions and stored vacuum. For example, based on engine operating conditions and stored vacuum, a desired level of exhaust backpressure (e.g., upstream of an exhaust catalyst) is may be determined, and EBV position may be controlled based on the desired exhaust backpressure (e.g., in accordance with the method of FIG. 5). However, if catalyst regeneration or cold start conditions are present, the method of FIG. 6 or FIG. 4 is performed, if engine shutdown is in progress the method of FIG. 7 is performed, and if engine operating conditions require a fully open EBV, the EBV is fully opened. As shown in FIG. 8, EBV position, intake throttle position, and spark timing may be controlled to expedite catalyst warmup without negatively affecting engine cranking, run-up, and idle during cold start. Further, as shown in FIG. 9, during normal engine operation, EBV position, intake throttle position, and spark timing may be controlled based on stored vacuum level. For example, the EBV may be closed to maximize vacuum-generating exhaust flow through the parallel ejector during conditions where stored vacuum falls below a threshold, and spark timing and intake throttle position may be adjusted based on the EBV position adjustment to compensate for the EBV position adjustment and thereby avoid affecting engine performance. In this way, an EBV arranged in parallel with an ejector downstream of an exhaust catalyst may be controlled throughout engine operation to achieve the dual benefits of vacuum generation and catalyst temperature control.

FIG. 1 shows a schematic depiction of a vehicle system 106. The vehicle system 106 includes an engine system 108, including engine 100 coupled to emission control system 122. Engine 100 includes a plurality of cylinders 130. Engine 100 also includes an intake 123 and an exhaust 125. Intake 123 may receive fresh air from the atmosphere through intake passage 142, and the air entering intake passage 142 may be filtered by an air filter 190. Intake 123 may include an intake throttle 162 fluidly coupled to the engine intake manifold 144 via intake passage 142. Intake throttle 162 may be positioned downstream of a compressor and a charge air cooler, and may be configured to adjust the flow of an intake gas stream entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 150. Turbocharger 150 may include a compressor 152, arranged along intake passage 142, and a turbine 154, arranged along exhaust passage 145. The amount of boost provided by the turbocharger may be varied by an engine controller.

Compressor 152 may be at least partially driven by turbine 154 via shaft 156. A compressor bypass valve (CBV) 183 may be arranged in a passage 181 to release pressure in the intake system when the engine is boosted. CBV 183 may allow compressed air to be recirculated into intake passage 142 upstream of compressor 152. For example, CBV 183 may open to recirculate compressed air upstream of compressor 152 to release pressure in the intake system during selected conditions to reduce the effects of compressor surge loading. In one particular example, CBV 183 is vacuum-actuated.

Some or all of the exhaust gases flowing through exhaust passage 145 can bypass turbine 154 via turbine bypass passage 157 as controlled by wastegate 159. In some examples, the position of wastegate 159 may be controlled electrically by an actuator 180 of control system 140. Alternatively, the position of wastegate 159 may depend on the pressure differential upstream and downstream of turbine 154.

An optional charge air cooler 184 may be included downstream of compressor 152 in the intake passage to reduce the temperature of the intake air compressed by the turbocharger. Specifically, charge air cooler 184 may be included upstream of intake throttle 162 or integrated into the intake manifold 144.

Emission control system 122, coupled to exhaust passage 145, includes a catalyst 170. Catalyst 170 may include multiple catalyst bricks, in one example. In another example, multiple emission control devices, each with multiple bricks, can be used. Catalyst 170 may be a three-way type catalyst, oxidation catalyst, lean NOx trap, selective catalyst reduction (SCR) device, gasoline particulate filter, catalyzed gasoline particulate filter, or other exhaust treatment device. In the embodiments described herein, catalyst 170 includes a gasoline particulate filter, for example as one of multiple bricks. Accordingly, references to "catalyst regeneration" herein refer to regeneration of the gasoline particulate filter portion of catalyst 170, which may be achieved in part by raising the temperature of catalyst 170 to burn off particulates stored in the gasoline particulate filter.

While catalyst 170 is arranged downstream of turbine 154 in the embodiments described herein, in other embodiments, catalyst 170 may be arranged upstream of a turbocharger turbine or at another location in the engine exhaust passage without departing from the scope of this disclosure.

An exhaust backpressure valve (EBV) 164 is located in the exhaust passage downstream of catalyst 170. In the embodiments described herein, controller 120 may control a position of EBV 164 based on various engine operating conditions and parameter values (e.g., engine cold start, stored vacuum level, shutdown, etc.). In other embodiments, the EBV, exhaust passage, and other components may be designed such that the EBV is mechanically controlled as needed during various engine operating conditions, without control system intervention.

EBV 164 may be maintained in a fully open position during most engine operating conditions, but may be configured to close to increase exhaust backpressure under certain conditions, as will be detailed below. In some embodiments, EBV 164 may have two restriction levels, fully open or fully closed. However, in preferred embodiments, the position of EBV 164 may be variably adjustable to a plurality of restriction levels by controller 12.

As detailed herein, adjustments of EBV position may affect air flow through the engine; a fully closed EBV may be conceptualized as a "potato in the tailpipe" which restricts exhaust flow. To compensate for the effects of EBV adjustment on engine air flow, other engine components may be adjusted. For example, as the EBV closes, mass air flow may initially decrease, and thus an intake throttle such as intake throttle 162 may open to admit more air to the engine to maintain engine speed and reduce torque fluctuation. Additionally, spark advance may be adjusted (e.g., advanced) to improve combustion stability. In some embodiments, valve timing may further be controlled in conjunction with EBV control to improve combustion stability during EBV adjustment.

As shown, an ejector 168 is arranged in a bypass passage 165. Bypass passage 165 is arranged in parallel with EBV 164, with one end of the bypass passage coupled upstream of the backpressure valve and the other end of the bypass passage coupled downstream of the backpressure valve. Depending on the position of EBV 164, some or all of the exhaust gas exiting catalyst 170 may bypass the backpressure valve and flow through bypass passage 165, providing a motive flow through ejector 168. For example, when the EBV is fully open, the EBV does not restrict exhaust flow through exhaust passage 145, and little or none of the exhaust flowing in exhaust passage 145 downstream of catalyst 170 bypasses the EBV via passage 165 (depending on the quantity of exhaust flow and relative diameters of passages 145 and 165). When the EBV is partially open, depending on the quantity of exhaust flow and relative diameters of passages 145 and 165, some exhaust may flow around the EBV while the remainder of the exhaust is diverted through ejector 168 via passage 165, bypassing the EBV. When the EBV is fully closed, all exhaust flow is directed into passage 165.

Motive flow through ejector 168 may generate vacuum at a suction port of ejector 168. The suction port of ejector 168 may be coupled with a vacuum reservoir 177, such that vacuum generated by motive flow through ejector 168 may be stored in vacuum reservoir 177 and supplied to one or more vacuum consumers such as a brake booster, front end accessory drive (FEAD), positive crankcase ventilation system, one or more vacuum-actuated valves, etc. In addition to vacuum from ejector 168, vacuum reservoir 177 may be coupled with one or more additional vacuum sources such as other ejectors arranged within vehicle system 106, electrically-driven vacuum pumps, engine-driven vacuum pumps, etc. A check valve 143 may be arranged intermediate the suction port of ejector 168 and vacuum reservoir 177, to isolate the ejector from the one or more additional vacuum sources. Similarly, a check valve 141 may be arranged intermediate the one or more additional vacuum sources and the vacuum reservoir 177. While one inlet to the vacuum reservoir with one check valve is depicted for the one or more additional vacuum sources, it will be appreciated that a check valve may be arranged between each additional vacuum source and the vacuum reservoir. By including check valves between the vacuum reservoir and each vacuum source, the effect of positive pressures at one or more vacuum sources on the stored vacuum at the vacuum reservoir may be reduced.

As shown, a sensor 192 is arranged in vacuum reservoir. Sensor 192 may be a gauge sensor reading vacuum, and may transmit data as negative vacuum (e.g., pressure) to controller 212. Accordingly, sensor 192 may measure the amount of vacuum stored in vacuum reservoir 177.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 180. As one example, sensors 160 may include exhaust gas oxygen sensor 126 coupled to exhaust manifold 148, MAP sensor 121 coupled to intake manifold 144, catalyst temperature sensor 117, exhaust pressure sensor 119 located upstream of catalyst 170 in tailpipe 135, exhaust temperature sensor 128 and exhaust pressure sensor 129 located downstream of catalyst 170 in tailpipe 135, and sensor 192 arranged in vacuum reservoir 177. Various exhaust gas sensors may also be included in exhaust passage 145 downstream of catalyst 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 180 may include fuel injector 166, CBV 183, wastegate 159, and intake throttle 162. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIGS. 3-7.

Now turning to FIG. 2, an example method 200 is shown for controlling a post-catalyst EBV, such as EBV 164 of FIG. 1. Method 200 determines whether one of various operations (engine start, shutdown, catalyst regeneration, catalyst over-temperature, maximum torque) is in progress. If so, the position of the EBV is controlled to optimize engine performance during that operation. Otherwise, the position of the EBV is controlled based on engine vacuum needs.

At 202, engine operating conditions and amount of stored vacuum are measured and/or estimated. The engine operating conditions may include, for example, current exhaust backpressure, catalyst temperature, exhaust mass air flow (MAF), engine speed, driver-requested torque, engine coolant temperature (ECT), VCT, MAP, BP, MAT, engine shut-down time, etc. These conditions may be measured directly via sensors such as sensors 160, or estimated based on sensor measurements and/or data stored in memory of the engine control system. The amount of stored vacuum (e.g., vacuum stored in a vacuum reservoir such as vacuum reservoir 177 of FIG. 1) may be determined by a gauge sensor reading vacuum such as sensor 192 of FIG. 1.

After 202, method 200 proceeds to 204 to determine whether engine shutdown conditions are present. In just one example, the control system may receive a signal when a vehicle operator turns the key in the ignition to shut down the vehicle, and this signal may set an engine shutdown flag. In this example, at 204, the value of this flag may be read, and it may be determined that an engine shutdown is in progress if the value of the flag is 1.

If the answer at 204 is YES indicating that engine shutdown conditions are present, method 200 proceeds to 206. At 206, method 200 includes performing the method depicted in FIG. 7, which will be described below. After performing the method of FIG. 7, method 200 ends.

Otherwise, if the answer at 204 is NO indicating that engine shutdown conditions are not present, method 200 proceeds to 208. At 208, method 200 includes determining desired exhaust backpressure based on engine operating conditions (e.g., catalyst temperature and anticipated vacuum consumption) and amount of stored vacuum. For example, during conditions where catalyst temperature is below a threshold, desired exhaust backpressure may be higher relative to desired exhaust backpressure during conditions where catalyst temperature is above the threshold, as increased exhaust backpressure may increase catalyst temperature due to the relationship between temperature and pressure. As another example, during conditions where stored vacuum is below a threshold for current engine operating conditions, desired exhaust backpressure may be higher relative to desired exhaust backpressure during conditions where stored vacuum is above the threshold for current operating conditions. In one example, the stored vacuum threshold may be based on anticipated vacuum consumption by any vacuum consumers of the vehicle system (e.g., anticipated maximum vacuum consumption during current engine operating conditions). Vacuum consumers of the vehicle system may include a brake booster, various vacuum-actuated valves such as charge motion control valves, a turbocharger turbine wastegate (e.g., wastegate 159 of FIG. 1), and compressor bypass valves, as well as variable engine mounts, wheel-to-axle disconnect, a positive crankcase ventilation system, etc. In one exemplary embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. When stored vacuum falls below the threshold for current engine operating conditions, it may be desirable to increase exhaust backpressure by decreasing opening of an EBV such as EBV 164 of FIG. 1, so as to increase an amount of exhaust directed through an ejector arranged in parallel with the EBV (e.g., ejector 168 of FIG. 1) and thereby increase vacuum generation.

After 208, method 200 proceeds to 210. At 210, it is determined whether current exhaust backpressure (as measured and/or estimated at 202) is less than desired exhaust backpressure (as determined at 208). For example, controller 120 may compare the two values and set a flag when current exhaust backpressure is less than desired exhaust backpressure.

EBV control would go into a pressure feedback mode where the position would be modulated to yield the desired exhaust backpressure. At 212, method 200 includes fully opening the EBV. As used herein, "fully opening the EBV" may refer to fully opening the EBV from a partially open or fully closed position, or maintaining the EBV in a fully open position if it is already in a fully open position. After 212, method 200 ends.

At 210, method 200 includes determining whether engine operating conditions require a fully open EBV. This may include determining whether full or partial EBV closure during the current engine operating conditions will adversely affect engine performance, and if so, whether the adverse effects are severe enough that the EBV should remain in or be controlled to a fully open position. In one example, the determination may be made in accordance with the method depicted in FIG. 3 and described below.

If the answer at 210 is YES, indicating that engine operating conditions require a fully open EBV, method 200 proceeds to 212. At 212, method 200 includes fully opening the EBV. As used herein, "fully opening the EBV" may refer to fully opening the EBV from a partially open or fully closed position, or maintaining the EBV in a fully open position if it is already in a fully open position. After 212, method 200 ends.

Otherwise, if the answer at 212 is NO indicating that engine operating conditions do not require a fully open EBV, method 200 proceeds to 214. At 214, method 200 includes determining whether catalyst regeneration conditions are present. The determination may be made based on factors such as exhaust backpressure measured upstream of the catalyst, engine operation time since the last catalyst regeneration, total exhaust mass flow through the catalyst since the last catalyst regeneration, catalyst operating conditions, etc. For example, if catalyst operating conditions are acceptable, and/or an acceptable duration between regenerations has not been exceeded, and/or exhaust backpressure upstream of the catalyst is at an acceptable level, catalyst regeneration conditions may not be present. Alternatively, if catalyst operating conditions are unacceptable (e.g., the gasoline particulate filter portion of the catalyst is overloaded), and/or an acceptable duration between regenerations has been exceeded, and/or exhaust backpressure upstream of the catalyst when the EBV is fully open is not at an acceptable level, If the answer at 214 is YES, method 200 proceeds to 216 to perform the method depicted in FIG. 6 and described below. Otherwise, if the answer at 214 is NO, method 200 proceeds to 218.

At 218, method 200 includes determining whether cold start conditions are present. For example, this determination may be based on various indications, such as crankshaft position, driver key position, ECT, catalyst temperature, combustion event number, etc. If the answer at 218 is YES, method 200 proceeds to 220 to perform the method depicted in FIG. 4 and described below. Otherwise, if the answer at 218 is NO, method 200 proceeds to 222.

At 222, method 200 includes controlling EBV position based on desired exhaust backpressure, and adjusting spark timing and intake throttle position based on EBV position. Controlling EBV based on desired exhaust backpressure may include controlling EBV position in a pressure feedback mode, where EBV position is modulated to yield the desired exhaust backpressure (e.g., where the desired exhaust backpressure is a backpressure which will result in replenishment of stored vacuum). However, an increase or decrease in exhaust backpres sure may alter engine output. For example, increased backpres sure reduces engine output thus other actions to increase engine output (or decrease other parasitic power) are required to maintain the target propulsive force. To ensure that adjustment of EBV position is neutral with respect to propulsive force, spark timing may be advanced from MBT (minimum spark advance for best torque) during conditions where EBV opening is decreased. Advancing spark timing from MBT may increase engine torque and/or RPM, which may compensate for a reduction in engine torque and/or RPM which may occur due to decreasing opening of the EBV. As a further measure to ensure that decreasing the EBV opening does not negatively affect engine performance, the intake throttle may be opened (either partially or fully). As EBV opening decreases, mass air flow may initially decrease, and thus the intake throttle may open to maintain engine air flow rate while increased exhaust backpressure is present due to closure of the EBV.

In one example, the method of FIG. 5 (described below) may be performed at step 222. Accordingly, whereas EBV position and related engine operating parameters may be controlled in specific ways during certain operating conditions (catalyst regeneration, cold start, etc.), control of EBV position and related engine operating parameters during other engine operating conditions may be focused on achieving the desired exhaust backpressure.

After 222, method 200 ends. It will be appreciated that method 200 may be performed repeatedly throughout engine operation, and as such, the EBV position achieved at 222 may remain in effect until either the desired exhaust backpressure is achieved, or until a change in engine operating conditions results in different control of the EBV (e.g., conditions require a fully open EBV, desired exhaust backpressure changes, catalyst regeneration is performed, etc.).

Figure 3:
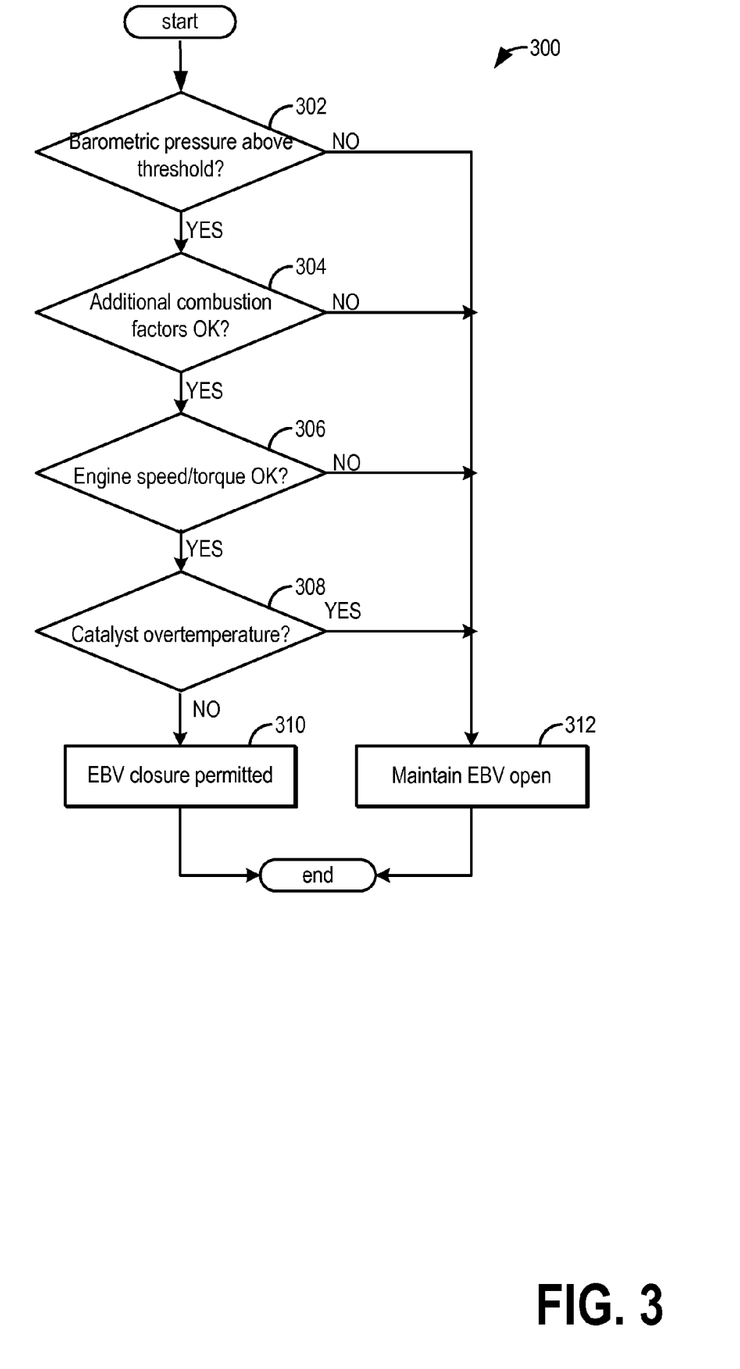
FIG. 3 shows a high level flow chart illustrating a method that may be implemented for determining whether engine operating conditions permit closure of an exhaust backpressure valve according to the present disclosure.

In FIG. 3, an example method 300 is shown for determining whether engine operating conditions permit closure of an EBV, such as EBV 164 of FIG. 1.

At 302, method 300 includes determining whether barometric pressure is above a threshold. The threshold barometric pressure may be a pressure below which the engine cannot achieve the desired engine speed and/or torque with the EBV closed. For example, the engine may not be able to achieve a high idle speed with the transmission in drive and certain accessories active, if the EBV is closed. The barometric pressure may be measured by a pressure sensor that determines the pressure of the air entering the intake system of the engine. In other embodiments, the barometric pressure may be correlated based on the altitude at which the engine is operating; the lower the altitude, the higher the barometric pressure. In yet another embodiment, the barometric pressure may be inferred based on the relationship between throttle angle and airflow, or based on a MAP sensor reading at certain conditions when pressure drop across the throttle is small. At relatively low barometric pressure, the amount of mass airflow may be low enough to substantially limit engine performance, especially with the EBV closed. If the EBV is closed when the engine is operating in low barometric pressure conditions, poor performance or engine stalling or other problems may occur. Thus, if it is determined that barometric pressure is not above the threshold, method 300 proceeds to 312 to maintain the EBV valve open to avoid poor performance or engine stalling.

If it is determined that the barometric pressure is above the threshold, method 300 proceeds to 304 to determine if additional combustion factors are at suitable levels. The additional combustion factors may include factors that impact combustion stability, including humidity of the intake air, quality of the fuel injected to the engine (e.g., fuel volatility), ambient temperature, component temperature(s), level of adaptive learning of air-fuel ratio of the controller, etc. If the additional combustion factors are not at suitable levels, method 300 proceeds to 312 to maintain the EBV open. However, if the additional combustion factors are at suitable levels (e.g., if it is determined that the engine could achieve stable combustion with the EBV closed), method 300 proceeds to 306 to determine if the current engine speed and torque request is suitable to close the EBV. Closing the EBV reduces flow of intake air into the cylinders. If the engine is operating with high speed and/or load, for example, closing the EBV may limit the speed of the engine or torque produced by the engine. Thus, if the current engine speed and torque request cannot be delivered with the EBV closed, method 300 proceeds to 312 to maintain the EBV open.

If the current speed and torque may be delivered with the valve closed, method 300 proceeds to 308 to determine if catalyst overtemperature conditions are present. In one example, this may include determining whether catalyst temperature exceeds a threshold, where the threshold is either a fixed threshold corresponding to physical properties of the catalyst or a variable threshold determined based on engine operating conditions, catalyst age, catalyst degradation, etc. If the answer at 308 is YES indicating that catalyst overtemperature conditions are present, method 300 proceeds to 312 to maintain the EBV open. Otherwise, if the answer at 308 is NO indicating that catalyst overtemperature conditions are not present, method 300 proceeds to 310 to indicate that EBV closure is permitted. In some examples, step 310 may include setting a flag in memory indicating that EBV closure is permitted, or enabling EBV closure by other control routines. After 310, method 300 ends.

FIG. 4 illustrates a method 400 that may be implemented for controlling an EBV such as EBV 164 of FIG. 1 during an engine cold start. For example, method 400 may be performed upon determination that an engine cold start is in progress via method 200.

At 402, method 400 includes determining combustion event number. For example, an engine controller such as controller 120 may be configured to count a number of cylinder combustion events from a first combustion event (or first cylinder event).

After determining combustion event number at 402, method 400 proceeds to 404 to control EBV position based on the combustion event number and desired backpressure (e.g., the desired backpressure determined at step 208 of method 200). For example, a lookup table stored in memory of the control system may specify an appropriate EBV position for each combustion event number during an engine cold start for current engine operating conditions. Accordingly, step 404 may include the controller accessing a memory of the control system to determine the EBV position appropriate for current engine operating conditions (e.g., catalyst temperature) and current combustion event number, and controlling EBV position accordingly.

After 404, method 400 proceeds to 406. At 406, method 400 includes adjusting spark timing and intake throttle position based on EBV position. For example, as described above for step 222 of method 200, this may include adjusting spark timing and intake throttle position to reduce negative effects on engine performance which may result from adjustment of the EBV position to partially open or fully closed positions.

After 406, method 400 proceeds to 408 to determine whether a predetermined number of combustion events have been completed since engine start. In some examples, the predetermined number may be a number of combustion events after which engine speed has typically achieved a maximum run-up speed. In other examples, the predetermined number may be a number of combustion events after which the catalyst should have achieved light-off temperature (e.g., a temperature below which the catalyst may not suitably convert emissions in the exhaust) for current engine operating conditions.

If the answer at 408 is NO, indicating that the predetermined number of combustion events have not been completed, method 400 proceeds to 412. At 412, method 400 includes determining whether an engine shutdown is in progress. If the answer at 412 is NO, method 400 returns to 402 to repeat steps 402-408 until the predetermined number of combustion events have been completed (or alternatively, until an engine shutdown occurs). Otherwise, if the answer at 412 is YES indicating that an engine shutdown is in progress, method 400 proceeds to 414 to perform the method of FIG. 7, which will be described below. After 414, method 400 ends.

Returning to 408, if the answer is YES indicating that the predetermined number of combustion events have been completed, method 400 proceeds to 410. At 410, method 400 includes determining whether catalyst temperature is greater than a threshold. For example, this may include measuring catalyst temperature (e.g. via a catalyst temperature sensor such as sensor 117 of FIG. 1) or inferring catalyst temperature based on other engine operating parameter values, and comparing the measured or inferred catalyst temperature to a threshold. The threshold may correspond to a light-off temperature of the catalyst, in one example.

If the answer at 410 is NO indicating that catalyst temperature is not greater than the threshold, method 400 proceeds to 416. At 416, method 400 includes determining the degree and duration of EBV closure needed for catalyst temperature to exceed the threshold. In some examples, the control system may make the determination using a formula including the catalyst temperature threshold and current engine operating conditions as parameters. In other examples, the determination may be made based on values stored in a lookup table in memory of the engine control system.

After 416, method 400 proceeds to 418. At 418, method 400 includes controlling EBV position to the degree determined at 416, for the duration determined at 416. For example, the controller may send a signal to the EBV to control the EBV position to the determined degree. After the duration, method 400 returns to 410 to again determine whether catalyst temperature exceeds the threshold. In some embodiments (not shown), if the answer at 410 is NO upon the second iteration of 410, this may indicate that the EBV or other related engine components are not functioning properly.

Once catalyst temperature exceeds the threshold, the answer at 410 is YES, and method 400 proceeds to 420. At 420, method 400 includes controlling the EBV to a predetermined position and adjusting spark timing and intake throttle position based on the predetermined position until engine idle. The predetermined position may be a position which maintains catalyst temperature within a desired range (e.g., above the threshold but below catalyst overtemperature) while ensuring that air flow through the engine is maintained. In one example, the predetermined position may be a first partially open position, as shown in FIG. 8 at 810 and described below. As described above, spark timing and intake throttle position may be adjusted based on the EBV position to compensate for the engine's reduced volumetric efficiency that may result when the EBV position deviates from a fully open position. After 420, method 400 ends.

It will be appreciated that in some embodiments, rather than controlling the EBV to a predetermined position after the predetermined number of combustion events have been completed, the EBV position may be controlled proportional to exhaust MAF.

Figure 5:
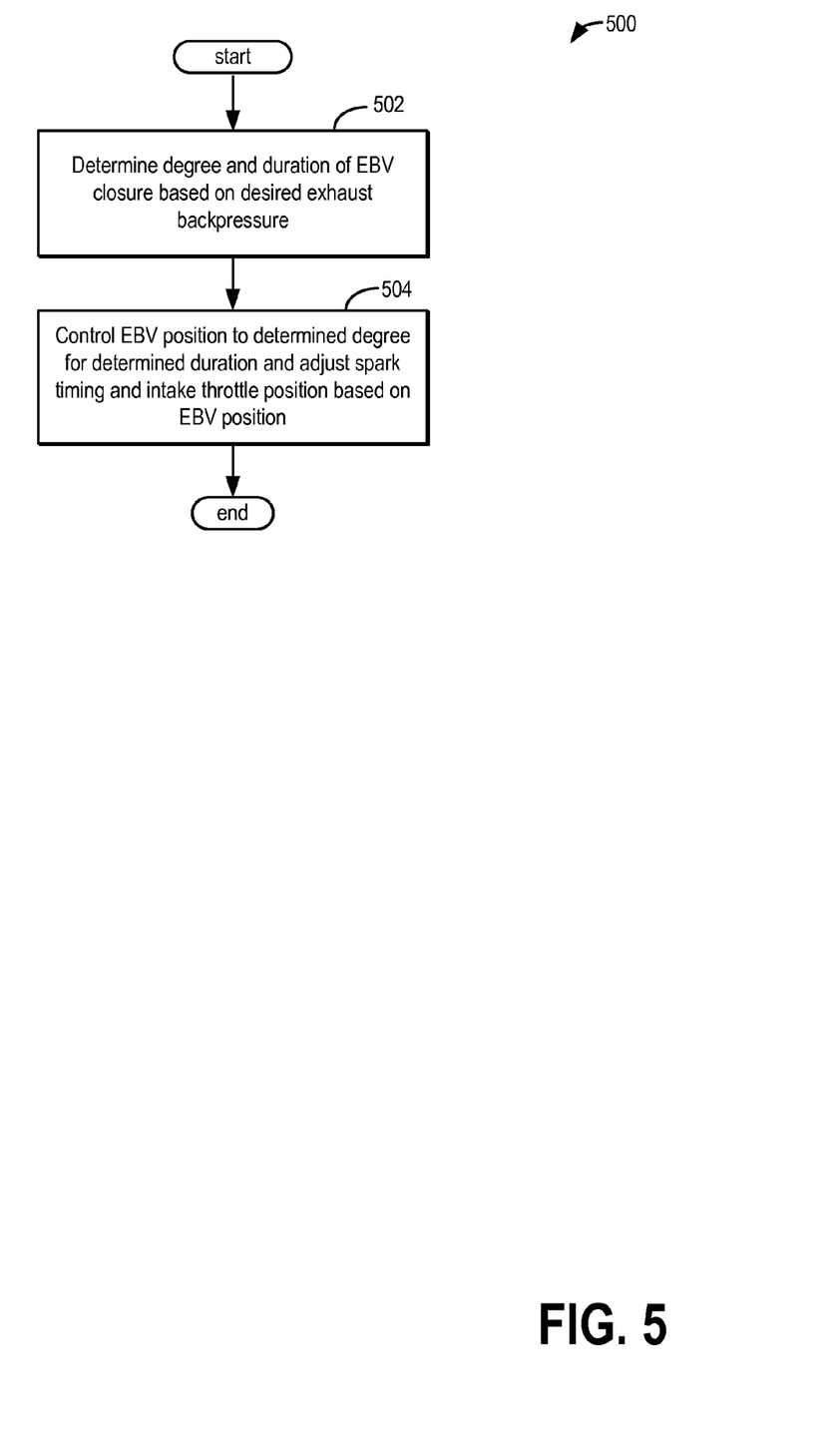
FIG. 5 shows a high level flow chart illustrating a method that may be implemented for controlling an exhaust backpressure valve to achieve a desired exhaust backpressure according to the present disclosure.

FIG. 5 illustrates a method 500 that may be implemented for controlling an EBV such as EBV 164 of FIG. 1 to achieve desired exhaust backpressure (e.g., in order to replenish stored vacuum). For example, method 500 of FIG. 5 may be performed at step 222 of method 200.

At 502, method 500 includes determining the degree and duration of EBV closure needed based on the desired exhaust backpressure (e.g., as determined at step 208 of method 200). In some examples, the control system may make the determination using a formula including the desired exhaust backpressure and current engine operating conditions as parameters. In other examples, the determination may be made based on values stored in a lookup table in memory of the engine control system.

After 502, method 500 proceeds to 504. At 504, method 500 includes controlling EBV position to the degree determined at 502, for the duration determined at 502. For example, the controller may send a signal to the EBV to control the EBV position to the determined degree. After the duration, the controller may send another signal to the EBV to either return the EBV to a default position (e.g., fully open) or to control the EBV to a different position based on further execution of method 200 during the duration, in one example.

At 504, method 500 further includes adjusting spark timing and intake throttle position based on EBV position. For example, as described above, spark timing and intake throttle position may be adjusted based on the EBV position to compensate for the engine's reduced volumetric efficiency that may result when the EBV position deviates from a fully open position. After 504, method 500 ends.

FIG. 6 depicts a method 600 for controlling an EBV such as EBV 164 of FIG. 1 during catalyst regeneration. For example, method 600 may performed when it is determined at step 214 of method 200 that catalyst regeneration is in progress. During catalyst regeneration, the EBV may be controlled to expedite heating of the catalyst to a temperature appropriate for gasoline particulate filter regeneration, and to achieve a desired air flow for catalyst regeneration.

At 602, method 600 includes determining a desired catalyst regeneration temperature. The desired catalyst regeneration temperature may be determined based on physical properties of the catalyst such as material, structure, and size, and/or based on catalyst age, loading, and other relevant factors.

After 602, method 600 proceeds to 604. At 604, method 600 includes determined a desired air flow for catalyst regeneration. In some examples, the desired catalyst regeneration air flow may be determined based on the desired catalyst regeneration temperature (as determined at 602), and/or based on current catalyst temperature (e.g., as measured by catalyst temperature sensor 117.

After 604, method 600 proceeds to 606. At 606, method 600 includes determining a degree of EBV closure and a duration of EBV closure based on the desired air flow and temperature for catalyst regeneration determined at steps 602 and 604, respectively. For example, a greater degree of EBV closure may be used to achieve less air flow and higher temperature, whereas a lesser degree of EBV closure may be used to achieve more air flow and lower temperature. The EBV closure duration may determine the duration of these effects on air flow and catalyst temperature. Controller 120 may use various formulae and/or may access various lookup tables stored in memory to determine the appropriate degree and duration of EBV closure during catalyst regeneration.

After 606, method 600 proceeds to 608. At 608, method 600 includes controlling EBV position to the degree determined at 606 for the duration determined at 606. Further, at 608 method 600 includes adjusting spark timing and intake throttle based on the EBV position (e.g., as described above for step 506 of method 500). After 608, method 600 ends.

FIG. 7 depicts a method 700 that may be implemented for controlling an EBV such as EBV 164 of FIG. 1 during engine shutdown. For example, method 700 may be performed at step 206 of method 200, when it has been determined that an engine shutdown is in progress.

At 702, method 700 includes determining whether the last combustion event has been completed. As just one example, the controller may track engine combustion events, and may set a flag when a last combustion event has been completed after an engine shutdown has been initiated.

If the answer at 702 is YES, method 700 proceeds to 704 to determine whether the last exhaust pulse has been pushed out past the EBV. In one example, the pressure values sensed by an exhaust pressure sensor such as exhaust pressure sensor 129 may be stored in memory, and the controller may access these sensed values to determine whether a fluctuation in the sensed pressure values corresponding to a last exhaust pulse has occurred.

If the answer at 704 is NO, indicating that the last exhaust pulse has not been pushed out past the EBV, method 700 proceeds from 704 to 706. Similarly, if it is determined at 702 that the last combustion event has not been completed, method 700 proceeds from 702 to 706. At 706, method 700 includes fully opening the EBV until the exhaust pulse has been pushed out past the EBV. In this way, it may be ensured that excess exhaust backpressure, which may potentially damage engine components, is not generated by the last exhaust pulse being pushed out against a closed EBV.

After 706, or if the answer at 704 is YES indicating that the last exhaust pulse has been pushed out past the EBV, method 700 proceeds to 708. At 708, method 700 includes fully closing the EBV while the engine spins down. Fully closing the EBV while the engine spins down may advantageously reduce reverse airflow through the catalyst and into the engine while the engine spins down. Such reverse airflow through the catalyst may be undesirable as it may increase catalyst degradation. I think plugging the catalyst after engine shut off is an interesting idea. I just can't dream up a believable reason to do so.

After 708, method 700 proceeds to 710. At 710, method 700 includes controlling the EBV to a default position when engine speed falls below a threshold. For example, when the engine speed falls below the threshold, an interrupt may be generated which prompts control of the EBV to the default position. In some examples, the default position is a fully open or substantially open position. After 710, method 700 ends.

FIG. 8 is a diagram 800 illustrating EBV position, intake throttle position, and spark timing during an engine cold start according to one example embodiment of the present disclosure. Time is depicted on the horizontal axis, and EBV position, intake throttle position, and spark timing are depicted on the vertical axis. Curve 802 depicts EBV position, curve 804 depicts intake throttle position, and curve 806 depicts spark timing.

Referring to curve 802, EBV position during an engine cold start is depicted. Prior to time $T_1$, the engine may be off, and the EBV may be in a default position indicated at 808. In the depicted example, default position 808 may be a second partially open position, which may be a position with a larger degree of opening as compared to a first partially open position. At time $T_1$, the engine may be started (e.g., when the driver turns a key in the ignition). At this point, the EBV may be fully opened to facilitate cranking of the engine. At time $T_2$, the engine may transition from the cranking phase to the run-up phase. At this point, the EBV may be fully closed to expedite catalyst heating. The EBV may remain fully closed until time $T_3$, which may correspond to the time when a predetermined number of combustion events have been completed. As discussed above with respect to method 400, the predetermined number of combustion events may be a number of combustion events after which the engine has typically achieved a maximum run-up speed. At this time, if catalyst temperature is greater than a threshold, the EBV may be opened to a predetermined position 810. As shown, the predetermined position may be a first partially open position. The EBV may remain in the predetermined position during engine idle, to continue expediting catalyst heating.

As shown by curve 804, prior to time $T_1$, the intake throttle may be in a default position 814. In the example shown in FIG. 8, default position 814 is a first partially open position, to compensate for the reduced air flow through the engine due to the second partially open position of the EBV prior to time $T_1$. After time $T_1$, during cranking, the intake throttle may be fully closed initially to facilitate cranking by increasing intake manifold vacuum. However, once intake manifold vacuum reaches a threshold, the opening amount of the intake throttle may be ramped up to increase airflow to the engine until cranking is completed at time $T_2$. Then, at time $T_2$, the intake throttle may be fully opened to compensate for the reduced air flow through the engine due to the fully closed position of the EBV. In the example depicted in FIG. 8, catalyst temperature has increased above a threshold (e.g., a light-off threshold) before time $T_3$. Accordingly, at time $T_3$ the EBV may be controlled to the predetermined position (e.g., a first partially open position in the example of FIG. 8), and the intake throttle may be controlled to a predetermined position 816 (e.g., a second partially open position in the example of FIG. 8), to compensate for the reduced engine air flow due to the partial closure of the EBV. The intake throttle may remain in the predetermined position during engine idle, as shown.

Spark timing may also be adjusted responsive to the closure of the EBV. For example, as depicted by curve 806, MBT 812 may be used upon engine start at time $T_1$ and during cranking. However, when the EBV is fully closed at time $T_2$, spark timing may be advanced from MBT to reduce combustion instability that may result when the EBV closes. Once the EBV valve opens to the predetermined position at time $T_3$, the spark timing advance may be slightly reduced, as less reduction of combustion instability may be needed. It will be appreciated that in other examples, for example during engine operating conditions where combustion instability is less likely, spark timing may instead be retarded from MBT while the catalyst is below operating temperature, to assist in production of excess heat to warm the catalyst.

FIG. 9 is a diagram 900 illustrating stored vacuum level, EBV position, intake throttle position, and spark timing during engine operation according to one example embodiment of the present disclosure. Time is depicted on the horizontal axis, and stored vacuum level, EBV position, intake throttle position, and spark timing are depicted on the vertical axis. Curve 902 depicts stored vacuum, curve 904 depicts EBV position, curve 906 depicts intake throttle position, and curve 908 depicts spark timing. Whereas diagram 800 of FIG. 8 is directed to an engine cold start, diagram 900 is directed to normal engine operation, e.g. engine operation after starting when the vehicle is moving.

Referring to curve 902, the level of stored vacuum is depicted. The level of stored vacuum may refer to vacuum stored in a vacuum reservoir such as vacuum reservoir 177 of FIG. 1, in some examples. In other examples, the level of stored vacuum may refer to a total amount of vacuum stored in various vacuum storage elements of the vehicle system. As shown, at time $T_1$ the amount of stored vacuum falls below a threshold 910. Threshold 910 may be a predetermined threshold which corresponds to a minimum stored vacuum level required to enable operation of vacuum-actuated engine components such as a brake booster, vacuum-actuated valves, etc. At this point, the EBV position may be controlled to generate vacuum via flow of exhaust through an ejector arranged in parallel with the EBV such as ejector 168 of FIG. 1, as will be described below with respect to curve 904. By time $T_2$, the amount of stored vacuum has increased above threshold 910, and it remains above the threshold until time $T_3$, at which point it again falls below the threshold (e.g., due to sudden braking or due to the load on one or more vacuum-actuated valves increasing). Again, as will be described below, the EBV may be closed to generate ejector vacuum to replenish the stored vacuum. By time $T_4$, the amount of stored vacuum has again increased above threshold 910.

Referring now to curve 904, EBV position during normal engine operation (e.g., after engine start and before engine shutdown) is depicted. At time $T_1$, when the amount of stored vacuum falls below threshold 910, the EBV may be controlled to a first position 912 for a first duration. For example, method 500 may be performed when the amount of stored vacuum falls below threshold 910, and the degree and duration of EBV closure determined at 504 may correspond to the first position and first duration. In the example shown in diagram 900, the first position may be a first partially open position. After the first duration, at time $T_2$, the amount of stored vacuum has increased above threshold 910, and the EBV is controlled from the first position to a fully open position to maximize air flow through the engine. However, at time $T_3$ when the amount of stored vacuum again falls below the threshold, the EBV is controlled to a second position 914 for a second duration. The second position and second duration may also be determined at step 504 of method 500. As shown in FIG. 9, whereas the amount of stored vacuum barely dips below threshold 910 between time $T_1$ and $T_2$, it dips further below threshold 910 between time $T_3$ and $T_4$. Accordingly, as shown, the second position is a greater degree of closure of the EBV relative to the first position, and the second duration is a longer duration relative to the first duration. In this example, the second position is a fully closed position of the EBV, which may maximize vacuum production as it ensures that a maximum amount of exhaust is directed through an ejector arranged in parallel with the EBV. As shown, at time T4 the amount of stored vacuum again increases above threshold 910, and the EBV is fully opened.

As shown by curve 906, prior to the EBV adjustment at time $T_1$, the intake throttle may be in a default position 916. In the example shown in FIG. 9, default position 916 is a first partially open position, which may provide an appropriate amount of air flow through the engine during normal engine operation. However, when the EBV is adjusted to the first position 912 at time $T_1$, the intake throttle may be opened to increase airflow to the EBV while it is in the first position. The intake throttle may then return to default position 916 when the EBV reopens at time $T_2$ and remain in that position until the EBV closes at time $T_3$, at which point it may be opened to increase airflow to the EBV while it is in the second position. The intake throttle may then remain open until the EBV reopens at time $T_4$. It will be appreciated that when the EBV is fully open, the intake throttle is not needed for EBV compensation, and thus the intake throttle may be controlled to improve engine operation during these conditions. For example, after time $T_4$, the EBV is open and the amount of stored vacuum is above threshold 910. As such, the intake throttle may be controlled based on engine operating conditions to improve engine operation at this time. In the depicted example, this includes increasing and then decreasing opening of the intake throttle, which may be an appropriate response to driver tip-in. In other examples, intake throttle position may be controlled based on engine torque demands or other engine operating conditions throughout engine operation, with appropriate offsets added to compensate for EBV position when the EBV is not in a fully open position.

Spark timing may also be adjusted responsive to the closure of the EBV. For example, as depicted by curve 908, MBT 918 may be used during conditions where the EBV is fully open, and spark timing may be advanced from MBT during conditions where the EBV is not fully open. As shown, when the EBV is opened to a first partially open position between time $T_1$ and $T_2$, spark timing may be advanced from MBT to reduce combustion instability that may result due to the partial closure of the EBV. Once the EBV valve fully reopens at time $T_2$, spark timing may return to MBT 918. Then, when the EBV is fully closed at time $T_3$, spark timing may be advanced further from MBT (relative to the spark advance between time $T_1$ and $T_2$) to maximize reduction of combustion instability. In other examples, however, spark timing may be controlled in other ways to reduce combustion instability and improve engine operation, or spark timing may be controlled independent of EBV position.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

The invention claimed is:

1. A method for generating vacuum from post-catalyst engine exhaust, comprising:
    flowing engine exhaust gas through an exhaust passage to a catalyst positioned in the exhaust passage downstream of an engine; and
    flowing exhaust gas through the exhaust passage from the catalyst to an exhaust backpressure valve (EBV) and an ejector, each positioned in the exhaust passage downstream of the catalyst and in parallel with each other.

2. The method of claim 1, further comprising providing vacuum generated by the ejector to one or more vacuum consumers.

3. The method of claim 2, further comprising controlling EBV position based on a desired exhaust backpressure, the desired exhaust backpressure based on engine operating conditions and stored vacuum.

4. The method of claim 3, further comprising controlling EBV position based on combustion event number for a predetermined number of combustion events after engine start.

5. The method of claim 3, further comprising controlling EBV position based on an amount of vacuum replenishment needed after catalyst warm-up.

6. The method of claim 3, further comprising controlling EBV position based on a desired catalyst regeneration air flow and temperature during catalyst regeneration.

7. The method of claim 3, further comprising fully opening the EBV after completion of a last combustion event before engine shutdown, fully closing the EBV while the engine spins down after a last exhaust pulse, and controlling the EBV to a default position after the engine spins down.

8. A system for generating vacuum from post-catalyst engine exhaust, comprising:
    an exhaust passage coupled to a turbocharged engine;
    a catalyst coupled in the exhaust passage downstream of the turbocharged engine;
    an exhaust backpressure valve (EBV) arranged in the exhaust passage downstream of the catalyst; and
    a vacuum-producing ejector arranged in the exhaust passage in parallel with the EBV.

9. The system of claim 8, wherein the ejector communicates with one or more vacuum consumers.

10. The system of claim 9, wherein EBV position depends on engine operating conditions and stored vacuum.

11. The system of claim 9, wherein intake throttle position and spark timing depend on EBV position.

12. The system of claim 9, further comprising a wastegate arranged in parallel with a turbine coupled to the engine.

13. The system of claim 9, wherein the catalyst is a three-way catalyst.

14. A method for generating vacuum from post-catalyst engine exhaust, comprising:
    flowing exhaust from an engine through a catalyst positioned in an exhaust passage;
    adjusting a position of an exhaust backpressure valve (EBV) based on engine operating conditions and stored vacuum, the EBV positioned in the exhaust passage downstream of the catalyst; and
    flowing exhaust through an ejector positioned in the exhaust passage in an amount depending on EBV position, the ejector arranged in parallel with the EBV.

15. The method of claim 14, further comprising adjusting spark timing and throttle position based on EBV position.

16. The method of claim 15, further comprising supplying vacuum generated by the ejector to one or more vacuum consumers.

17. The method of claim 16, wherein adjusting EBV position during a cold start comprises controlling EBV position based on combustion event number for a predetermined number of combustion events after engine start.

18. The method of claim 16, wherein adjusting EBV position during catalyst regeneration comprises determining degree and duration of EBV closure based on desired catalyst regeneration air flow and desired catalyst regeneration temperature.

19. The method of claim 16, wherein adjusting EBV position during engine shutdown comprises fully opening the EBV after completion of a last combustion event before engine shutdown, fully closing the EBV while the engine spins down after a last exhaust pulse, and controlling the EBV to a default position after the engine spins down.

20. The method of claim 16, further comprising decreasing opening of the EBV when stored vacuum falls below a threshold.

* * * * *